United States Patent [19]

Altmann et al.

[11] Patent Number: 4,697,064
[45] Date of Patent: Sep. 29, 1987

[54] METHOD AND APPARATUS FOR HEATING SEATS ELECTRICALLY

[75] Inventors: Horst-Dieter Altmann, Gründau-Lieblos; Eberhard Haupt, Gründau-Rothenbergen, both of Fed. Rep. of Germany

[73] Assignee: I.G. Bauerhin GmbH Electro-Technische Fabrik, Gründau-Rothenbergen, Fed. Rep. of Germany

[21] Appl. No.: 826,068

[22] Filed: Feb. 4, 1986

[30] Foreign Application Priority Data

Feb. 19, 1985 [DE] Fed. Rep. of Germany ....... 3505652

[51] Int. Cl.$^4$ ............................................. H05B 3/36
[52] U.S. Cl. .................... 219/217; 219/202; 219/549; 219/528
[58] Field of Search ............. 219/200, 201, 202, 217, 219/521, 528, 529, 548, 549, 211, 212

[56] References Cited

U.S. PATENT DOCUMENTS

| 2,929,909 | 3/1960 | Gibbs | 219/528 |
| 3,017,493 | 1/1962 | Cooke | 219/202 |
| 3,288,912 | 11/1966 | Hussey | 219/213 |
| 3,729,613 | 4/1973 | Deloire | 219/529 |
| 4,044,221 | 8/1977 | Kuhn | 219/217 |
| 4,069,410 | 1/1978 | Keep | 219/528 |
| 4,220,848 | 9/1980 | McMullan | 219/345 |
| 4,335,725 | 6/1982 | Geldmacher | 219/202 |

FOREIGN PATENT DOCUMENTS

| 3013778 | 3/1982 | Fed. Rep. of Germany . | |
| 57-134655 | 8/1982 | Japan | 219/202 |
| 85/01632 | 4/1985 | PCT Int'l Appl. | 219/528 |
| 747511 | 4/1956 | United Kingdom | 219/528 |
| 895738 | 5/1962 | United Kingdom | 219/213 |

Primary Examiner—E. A. Goldberg
Assistant Examiner—Teresa J. Walberg
Attorney, Agent, or Firm—Marmorek, Guttman & Rubenstein

[57] ABSTRACT

A process and apparatus for electrically heating vehicle seats by using at least one meandering, insulated heat conductor covered on both sides by thermoplastic foil is disclosed. The heat conductor is spread over a bearing thermoplastic foil and covered with an identical foil. A firmly integrated heating element is then formed by applying heat and pressure. The heat conductors are located in meandering channels which are laid out according to a predetermined plan without any bending to the foils. The heating elements manufactured in this manner are combined with the cushion cores of the seat to be heated. In a preferred embodiment, the thermal deformation stability of the heat conductor insulation exceeds that of the foils by approximately 50%. In another preferred embodiment, the meandering channels are spaced a minimal distance apart from each other so as to make it possible to obtain a heating conductor of great length at rest and which can support stretching to at least twice its length and width at all stress points without sustaining any damage.

10 Claims, 5 Drawing Figures

METHOD AND APPARATUS FOR HEATING SEATS ELECTRICALLY

BACKGROUND OF THE INVENTION

The instant invention relates to a method for heating seats, in particular vehicle seats, electrically by means of at least one flat heating element with an insulated heating conductor which is covered on both sides.

Integrated electrical seat heaters, especially for vehicle seats, have been known for many years.

Depending upon the design of the seat, the actual seat heater, generally made of textile fibre, is bonded to the top of a foamrubber cushion core or is inserted into pockets formed by the upholstery material and, in some embodiments, is fastened to the seat. The size and quantity of the heating elements to be used for the cushion depend basically on the shape of the seat, whereby the heating elements generally espouse the form of the individual segments.

In all of these designs there exists the danger for folds to appear within the heating elements if these are not attached perfectly, and such folds can cause the heating conductor to break.

Furthermore, attachments by means of anchoring wires creates practically pre-programmed breaking points, and the existing art attempts to avoid these by means of transitions into soft, multipl-lead copper strands.

In manufacture, the making of the connections between heating elements and copper strands is labor-intensive and the lateral circumvention of the anchoring wires, which is also practiced, is difficult.

The instant invention therefore proposes a system, such as initially defined, which would be able to undergo deformations in use without any reduction of the elastic properties of the foam rubber core of the cushion.

SUMMARY OF THE INVENTION

The instant invention solves this problem in the following manner: At least one meandering, insulated heating conductor is spread out over a bearing thermoplastic foil which, as a rule, is covered with another, identical foil. The dimensional stability of the heating conductor insulation, when heated, must exceed that of the foils by approximately 50%.

A well-bonded heating element is formed by applying heat and pressure. The heating conductors of said heating elements are embedded in meandering channels laid out according to plan for desired heat distribution, without being bonded to the foils.

By laying out the meandering channels as closely as possible to each other, the heating element is given great length at rest, endowing it with such elastic properties as to allow it to be stretched to twice its length and width at every stress point without sustaining any damage.

The meandering layout of the insulated heat conductors on an elastic, plastic bearing foil can easily be installed by means of an ironing press, such as that of patent DE-PS No. 30 13 778.

Such a device is characterized in that the actual pressure plate is bonded, by means of an adhesive, to an ironing plate made of an elastic, porous, highly heat-conductive material maintaining a constant ironing temperature, whereby the needles of the needle template are completely recessed during the pressing process and reappear when the pressure plate is lifted.

The heat conductors go around pins arranged according with the desired layout, each pin determining a change in the direction of the heating conductor's path. It is very simple to change the layout.

In order to maintain the slideability of the insulated heating conductor, the dimensional stability of the insulated heating conductor under power must exceed that of the foil. The subsequent installation of the heating elements between the foils is effected by applying heat and pressure, using an embodiment such as, for instance, that of the above-mentioned DE-PS No. 30 13 778.

The great length of the heating conductor at rest, together with the elastic properties of the heating element are essential to the quality of said heating element.

The great number of meandering loops, arranged very closely to each other, make it possible to obtain a heating element of greater than average length, so that thermal deformation of the channels created by the insulation cannot in any way damage the heating conductor as the meanders are stretched in relation to each other, and inversely, so that the the heating conductor can not be subjected to excessive stress.

It is suggested here that the heat conductors be embedded in meanders having intervals of less than 15 mm between each other.

When cushion shapes are used to form a seat or back rest, it is suggested that these be upholstered with a covering material in the manufacturing process whereby the surfaces of the foam part, just below the covering fabric, are first bonded or foam-bonded to the heating elements which are to be installed on them.

In manufacture, foam-bonding is to be preferred to adhesive bonding, but different types of installation must often be provided as dictated by accessibility.

In the manufacture of seat or back rest cushions with the draw and ironing process, it is suggested that the air-tight covering fabric of the seat or back rest be drawn over a form with an embossed surface, whereby the surfaces of the heating elements to be installed against the inside of the covering fabric are bonded or laminated to said fabric so that when the form is covered with foam, the heating elements on the underside of the covering fabric become firmly attached to same.

It is suggested that foils with thicknesses from 20 to 200$\mu$ be used and that the heating conductor be formed with strands consisting of at least 7 leads each, whereby individual wires have a dimaeter of less than 0.1 mm and are covered with a thin insulation that does not adhere to the two foils.

The proposed process fully meets the objectives of the instant invention.

EXAMPLE

The heating elements with large surfaces provided for the heating of vehicle seats consist each of two thermoplastic foils of identical size and with identical characteristics, a co-polyamide basis being used in the instant example. The foils are 0.08 mm thick, their tensile strength is approximately 8 kp/mm$^2$, elasticity is 250 kp/mm$^2$ and dimensional stability according to Martens, when powered, is approximately 100° C.

The insulation of the heat conductor is also made of a co-polyamide or similar material and has a tensile strength of 6 kp/mm$^2$, an elasticity module of 190 kp/mm$^2$ and a dimensional stability, according to Martens, of 230°.

The insulated heat conductor, laid out between the thermoplastic foils as described above, is attached by means of an ironing press or similar device, while its slideability between the foils is maintained. The greater dimensional stability of the insulation ensures free movement of the heating element between the foils.

The individual heating elements can be placed under the covering of the seating surface as well as under the covering of the back rests, or can be integrated into the foam cushion parts.

BRIEF DESCRIPTION OF THE DRAWINGS

The invention is explained in greater detail in the embodiment given as an example in the drawings in which.

DETAILED DESCRIPTION OF THE DRAWINGS

Figure 1:
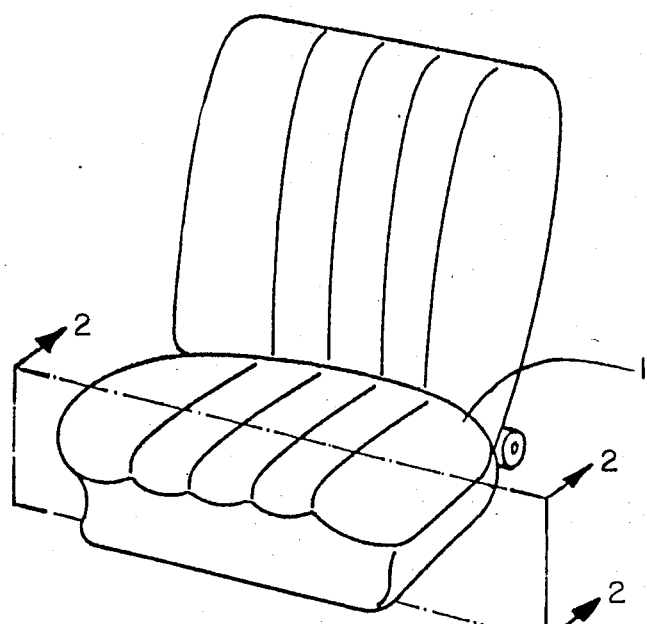
FIG. 1 is a perspective drawing of the seat to be heated.
Figure 2:
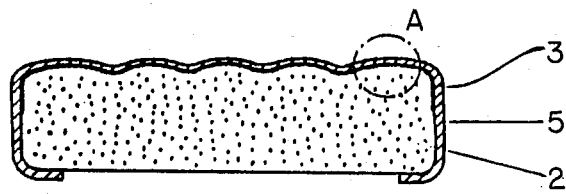
FIG. 2 is a section taken along I—I through FIG. 1.

FIG. 2 shows a cross-sectional view of the vehicle seat 1 depicted in FIG. 1. The vehicle seat 1 comprises a cushion core 2, whereby the side of the cushion core 2 oriented towards the seating surface is covered by the heating element 3. The heating element 3 is constituted by layers 3' and 3", which are made of knit carrier material and of the Teflon-insulated heating conductor 4. Heating conductor 4 is located beteen layers 3' and 3". The vehicle seat is covered on top with the upholstery material 5. The upholstery material 5 (for example artificial leather) is drawn into the form, the heating element 3 is laid in, and then foam is introduced into the cushion core 2. Through the use of this process, upholstery material 5, heating element 3 and cushion core 2 are permanently combined to form one unit.

Figure 3:
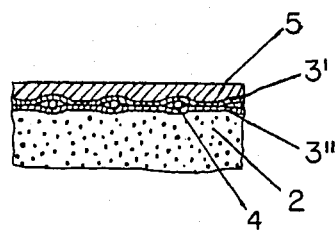
FIG. 3 is an enlargement of portion A of FIG. 2.
Figure 4:
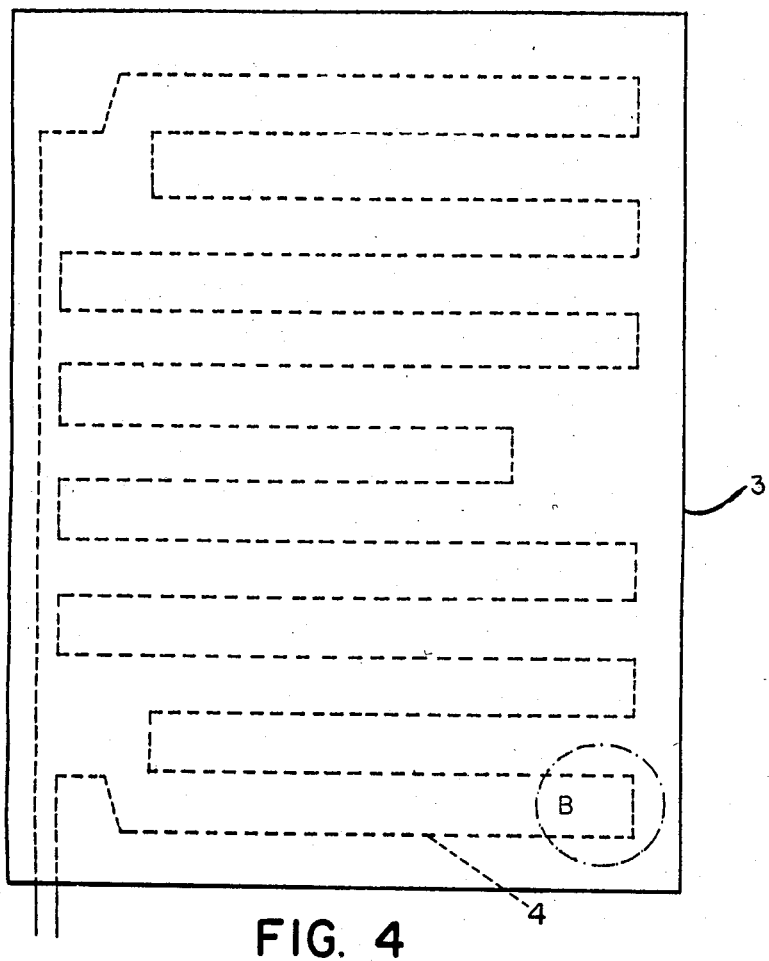
FIG. 4 is a top view of a heating element in accordance with the present invention.
Figure 5:
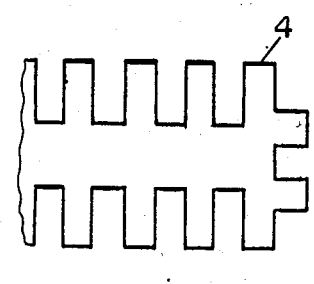
FIG. 5 is an enlargement of portion B of FIG. 4.

FIG. 3 shows portion A of FIG. 2 in more detail. In this drawing, the relationship of layers 3', 3" and the heating element 4 is emphasized. FIG. 4 is a top view of heating element 3, showing the layout of the Teflon-insulated heating conductor 4. FIG. 5, which shows portion B of FIG. 4 in more detail, depicts the meandering layout of heating conductor 4.

Whereas preferred embodiments of the present invention have been described above for purposes of illustration, it will be apparent to those skilled in the art that certain variations of the details may be made without departing from the spirit or scope of the invention.

What is claimed is:

1. A process for the electrical heating of seats, comprising
   (a) placing at least one elongated heat conductor on a first bearing foil made from a thermoplastic material;
   (b) insulating said heaat conductor with heating insulation having a dimensional stability exceeding that of said foil by approximately fifty percent;
   (c) spreading said heat conductor in meandering channels as closely as possible to each other;
   (d) covering said heat conductor with a second bearing foil substantially identical to said first bearing foil; and
   (e) bonding said first and second foil to each other and embedding said heat conductor in said meandering channels therebetween, said heat conductor being movable within said meandering channels.

2. The process of claim 1, further comprising
   (a) upholstering a seat with a covering fabric;
   (b) providing a foam part lying under said covering fabric;
   (c) foam bonding said heating element on the surface of said foam part.

3. The process of claim 1, further comprising
   (a) placing a covering fabric over a form with an embossed surface;
   (b) drawing and ironing the cushions of said form; and
   (c) gluing the surface of said heating element on the inside of said covering fabric, said heating element being firmly attached to said covering fabric when said form is covered with foam.

4. The process of claim 1, further comprising
   (a) placing a covering fabric over a foam with an embossed surface;
   (b) drawing and ironing the cushions of said form; and
   (c) laminating the surface of said heating element on the inside of said covering fabric, said heating element being firmly attached to said covering fabric when said form is covered with foam.

5. The process of claim 1, wherein said foils are from 20 to 200$\mu$ thick, and wherein the heat conductor includes wires having at least seven strands, each of said strands having a diameter of less than 0.1 mm, said heating conductor being insulated with a thin insulation which does not adhere to said foils.

6. A heating element for the electrical heating of seats, comprising
   first and second bearing foils made from a thermoplastic material, said foils being substantially identical in composition, said first and second bearing foils being bonded together,
   at least one elongated heat conductor provided with heating insulation having a dimensional stability exceeding that of said foils by approximately fifty percent, said heat conductor being embedded between said foils in meandering channels, said meandering channels being disposed as closely together as possible, said heat conductor being movable within said meandering channels, and
   spacing means intermittently disposed between said foils, said spacing means laying out a course for said heat conductor means, said heat conductor means being wrapped around said spacing means.

7. The heating element of claim 6, wherein the intervals between adjacent meandering channels are less than 15 mm.

8. The heating element of claim 6, wherein said foils are between 20 to 200$\mu$ thick.

9. The heating element of claim 6, wherein said heat conductor includes wires having at least 7 strands, each of said strands having a diameter of less than 0.1 mm, said strands being covered with a thin insulation which does not adhere to said foils.

10. The heating element of claim 6, further comprising a covering fabric of a seat, said covering fabric having an internal side and an external side, said heating element being firmly attached to said internal side of said covering fabric.

* * * * *